United States Patent [19]

Deutsch

[11] 4,376,046

[45] Mar. 8, 1983

[54] SYSTEM WITH ASYMMETRIC MICROPOROUS MEMBRANE FOR THE CIRCULATION OR MOVEMENT OF SOLUTIONS

[76] Inventor: Daniel H. Deutsch, 141 Kenworthy Dr., Pasadena, Calif. 91105

[21] Appl. No.: 268,872

[22] Filed: Jun. 1, 1981

[51] Int. Cl.$^3$ .............................................. B01D 31/00
[52] U.S. Cl. ..................................... 210/176; 210/181; 210/433.2; 417/207; 417/572
[58] Field of Search .................. 417/53, 207, 572; 210/193, 321, 433, 176, 353, 181, 500.2, 257.2

[56] References Cited

U.S. PATENT DOCUMENTS

| | | | |
|---|---|---|---|
| 3,303,085 | 2/1967 | Price et al. | 156/644 X |
| 3,415,993 | 12/1968 | Fleischer et al. | 156/644 X |
| 3,749,646 | 7/1973 | Pirt | 210/644 X |
| 3,770,532 | 11/1973 | Bean et al. | 156/644 X |
| 4,097,383 | 6/1978 | Ohtani et al. | 210/500.2 |
| 4,147,480 | 4/1979 | Deutsch | 417/572 |
| 4,148,619 | 4/1979 | Deutsch | 55/472 X |
| 4,207,183 | 6/1980 | Herrigel | 210/639 X |

*Primary Examiner*—David R. Sadowski
*Attorney, Agent, or Firm*—Lyon & Lyon

[57] ABSTRACT

Disclosed herein is a system for causing the circulation or movement of a solution comprising a conduit for the solution, a solution of conical shaped particles and an asymmetric microporous membrane disposed in the conduit so that the solution can only pass the membrane through its pores. The pores of the membrane are tapered with substantially all of the large openings on one side of the membrane and substantially all of the small openings on the other side. The conical shaped solute particles can diffuse in both directions through the tapered holes of the membrane but have dimensions which preclude them turning around, fore to aft, inside the holes of the membrane. The forward diffusional bias of the particles passing through the holes of the membrane produces a net transport of particles from the solution side of the membrane with the large pore openings to the solution side of the membrane with the small pore openings and the resultant concentration differential induces an osmotic pressure across the membrane causing the solvent to move through the membrane in the same direction as the net particle diffusion. Overall there is a net differential transport of solution from the side of the membrane with the large pore openings through the membrane to the side of the membrane with the small pore openings.

11 Claims, 3 Drawing Figures

SYSTEM WITH ASYMMETRIC MICROPOROUS MEMBRANE FOR THE CIRCULATION OR MOVEMENT OF SOLUTIONS

FIELD OF THE INVENTION

This invention relates to systems for causing the circulation or movement of solutions.

BACKGROUND OF THE INVENTION

The circulation or movement of solutions through open and closed systems has many technological applications. Mechanical reciprocating pumps, centrifugal pumps, undulating tubes, thermal gradients and propellers have all been used for causing the movement of solutions in appropriate circumstances.

One such common application of a moving solution that exemplifies both the advantages and the problems associated with systems for moving solutions is the circulation of a brine in an indirect heat exchange relationship with a process stream, for example, a gas or liquid undergoing heating or cooling. In this application, the heat exchange solution circulates, usually in a closed system, between the location at which it is in a heat exchange relationship with the process stream and the location at which it is either heated, if it is to heat the process stream, or cooled if it is to cool the process stream. The pumps or other means employed to circulate the solution have a large number of moving parts and suffer breakdowns and otherwise require frequent maintenance and are expensive to operate. Furthermore, the use of pumps and the like to move solutions increases the possibility of contaminating the circulating solution with foreign matter (for example, pump lubricant). Accordingly, a need exists for a system for moving or circulating solutions which is inexpensive to operate, which does not require substantial maintenance and/or which reduces or eliminates the possibility of contamination by foreign matter.

When a solution, U, of solute, X, in solvent, Y, is placed on one side of a semipermeable membrane, M, which is permeable to the solvent, Y, but impermeable to the solute, X, and the pure solvent, Y, is placed on the other side of this semipermeable membrane, M, then an osmotic pressure, $P_o$, develops in the solution U, such that:

$$P_o = cRT \qquad \text{EQ. (1)}$$

Where "c" is the molar concentration of the solute X in the solution U; R is the universal gas constant and T is the absolute temperature. This equation for osmotic pressure was proposed by van't Hoff in 1887 and is sometimes referred to as van't Hoff's Law.

In the above model, when the solution, U, and the pure solvent, Y, exert the same hydrostatic pressure on the membrane, M, the differential external pressure on the membrane $P_e$, is zero, and the osmotic pressure, $P_o$, generated in this system produces a net flow rate, $J_o$, of the solvent, Y, from the side containing the pure solvent through the semipermeable membrane into the side holding the solution, U, of solute, X, in solvent, Y. $J_o$ is, therefore, the net flow rate of liquid through the membrane when the differential external pressure on the membrane, P, is zero.

However, in the same model, if a differential external pressure on the membrane, $P_e$, is exerted through the solution, U, such that $P_e$ is greater than the osmotic pressure, $P_o$, then the pure solvent, Y, will flow in the reverse direction, i.e., from the solution, U, side of the semipermeable membrane into the pure solvent side of the semipermeable membrane. Large scale practical application of this is made in reverse osmosis where pure water is obtained from salt water by the use of a semipermeable membrane, pervious to water but impervious to salt.

The movement of molecules and small particles in a quiescent liquid is the direct result of their individual statistical average kinetic energy. For sufficiently large particles this motion is visible under high magnification and is called Brownian motion. For spherical particles the motion is random in direction. For non spherical particles, such as long rods, where the frictional coefficient is smaller for motion parallel to the longitudinal axis than for motion perpendicular to the longitudinal axis, the diffusional coefficient in the direction of the longitudinal axis is greater than the diffusional coefficient in any direction perpendicular to the longitudinal axis.

In the case of a conical shaped Brownian particle the equivalence of all the directions perpendicular to the axis of the cone requires that the diffusional coefficient in all the directions perpendicular to the axis of the cone be identical. The frictional coefficient for a conical shaped Brownian particle along the axis of the cone is less for motion towards the apex than the motion towards the base. Consequently, the diffusional coefficient for a conical Brownian particle along its axis will be greater in the direction of the apex than in the direction of the base.

In addition to the translational motions described above, conical shaped Brownian particles will undergo rotational Brownian motion.

Over all, the total effect is that the conical shaped solute particle meanders through the liquid with a forward bias towards the arbitrary direction in which the apex of the conical shaped solute particle happens to be pointed at that moment.

SUMMARY OF THE INVENTION

The present invention is a system for causing the circulation or movement of a solution comprising a conduit for the solution, a solution of conical shaped particles in a suitable liquid solvent and an asymmetric microporous membrane positioned in the conduit so that the movement of the solution through the conduit can only occur by passage through the membrane. The membrane is characterized in that the pores, or holes, are generally conically shaped, i.e., the holes taper from a large opening to a small opening. All, or substantially all, of the large openings are on one face of the membrane and all, or substantially all, of the small openings are on the other face.

The dimensions of the tapered holes through the membrane and the dimensions of the conical shaped solute particles are so chosen that the conical shaped solute particles can pass through the membrane in both directions. The diameter of the base of the conical shaped solute particle is less than the diameter of the smaller end of the tapered hole through the membrane. However, the height of the conical shaped solute particle is greater than the diameter of the larger end of the tapered hole through the membrane.

The general forward bias of the meandering conical shaped solute particles, noted above, together with the specific relative dimensions, outlined above, which prohibit the conical shaped solute particles from turning around, fore to aft, inside the tapered holes through the membrane, insure that all, or substantially all, of the conical shaped solute particles, after entering specific tapered holes, apex first, from either end of the tapered hole, will pass through the tapered holes to the opposite side of the membrane.

For a given specific concentration of conical shaped solute particles in the identical solutions on the two sides of the above described asymmetric microporous membrane with tapered holes, the rate at which the conical shaped solute particles enter, apex first, the tapered holes on a given unit area of the surface of the asymmetric microporous membrane from either side will be proportional to (1) the concentration of the conical shaped solute particles in the solution, (2) the time of contact, and (3) the total area of the openings of the tapered holes per unit surface area on each of the respective sides of the asymmetric microporous membrane. As time passes, more conical shaped solute particles will enter the tapered holes through the asymmetric microporous membrane from the side with the larger openings of the tapered holes and pass through and out the opposite side of the asymmetric microporous membrane than enter the tapered holes through the asymmetric microporous membrane from the side with the smaller openings of the tapered holes, and pass through and out the opposite side of the asymmetric microporous membrane. As a result, the concentration of the conical shaped solute particles increases on that side of the asymmetric microporous membrane with the smaller opening of the tapered holes, whereas the concentration of the conical shaped solute particles decreases on that side of the asymmetric microporous membrane with the larger opening of the tapered holes.

The osmotic pressure which results from the difference in concentration of the conical shaped solute particles on the two opposite sides of the asymmetric microporous membrane tends to move the solvent from the side of the asymmetric microporous membrane with the low concentration of the conical shaped solute particles through the asymmetric microporous membrane to the opposite side where there is a higher concentration of conical shaped solute particles.

The total effect is the movement of both the conical shaped solute particles and the solvent in the same direction through the asymmetric microporous membrane from the side with the larger hole openings to the side with the smaller hole openings, i.e., the anisotropic movement of the solution of conical shaped solute particles through the asymmetric microporous membrane from the side of the membrane with the larger holes to the side of the membrane with the smaller holes.

One object of this invention is to provide a system for causing the movement or circulation of solutions which is economical to operate.

Another object of the invention is provide a system for causing the movement or circulation of solutions which is easy to maintain.

Another object of the invention is to provide a system for causing the movement or circulation of solutions which minimizes the opportunity for contamination of the solution by foreign matter.

The achievement of these and other objectives will be apparent from a consideration of the following detailed description of the invention.

DETAILED DESCRIPTION OF THE INVENTION

As already noted, the present invention relies upon the diffusion of colloidally suspended or dissolved conical shaped particles, hereafter referred to collectively as "conical shaped solute particles", through an asymmetric microporous membrane. An asymmetric microporous membrane 10 having a plurality of tapered holes 20 useful in the practice of the invention is shown in FIG. 1.

Figure 1:
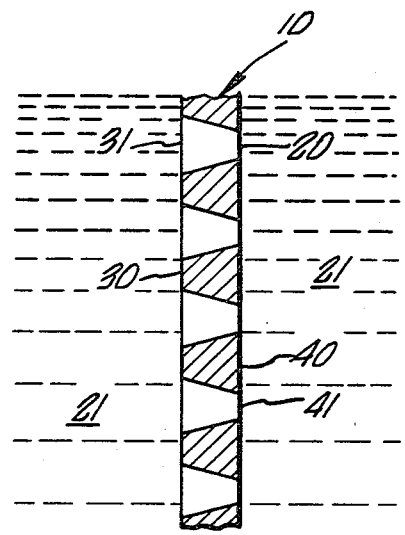
FIG. 1 is an enlarged cross-sectional fragmentary view of the circulating system of the present invention.

The term asymmetric microporous membrane (membrane for short) means any continuous planar configuration, including, without limitation, a flat sheet as shown in FIG. 1, a corrugated sheet, a dimpled sheet, a tube open at one end in which the wall of the tube is the membrane, a tube open at both ends, a semispherical sheet and the like.

The membrane 10 has a first side 30 and a second side 40. The tapered holes are oriented so that all, or substantially all of the larger openings 31 are on side 30 whereas all or substantially all of the smaller openings 41 are on side 40. The membrane is positioned in a solution 21 comprising the solvent and conical shaped solute particles. The solvent molecules and conical shaped solute particles diffuse by virtue of their average kinetic energy (Brownian motion) through the tapered holes 20 in both directions as explained more fully below.

Figure 2:
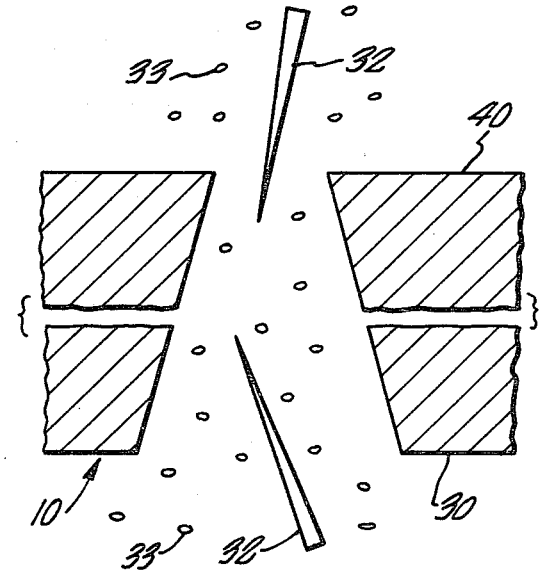
FIG. 2 is an enlarged partial cross-sectional view of a membrane like that of FIG. 1 showing the conical particles of the invention.

In FIG. 2 is shown conical shaped solute particles 32 beginning traverse of a tapered hole through the membrane 10. Only a small portion of the closely packed solvent molecules are shown in FIG. 2 and are designated 33. The membrane, tapered holes through the membrane, and the composition of the solution are selected according to the following criteria.

1. The taper of all, or substantially all the holes through the membrane have the same orientation. The larger openings of the tapered holes through the membrane are on one side of the membrane and the corresponding smaller openings of the tapered holes are on the opposite side of the membrane.

2. The tapered holes through the membrane are all of approximately the same size.

3. The length of the conical shaped solute particles is greater than the diameter of the larger opening of the tapered holes through the membrane.

4. The diameter of the base of the conical shaped solute particles is smaller than the diameter of the smaller opening of the tapered hole through the membrane.

5. The length of the conical shaped solute particles is not greater than about 100 $\mu$m.

6. The diameter of the base, of the conical shaped solute particles is less than the length of the conical shaped solute particles.

7. All of the constituent particles in the solution can pass through the smaller opening of the tapered holes through the membrane.

8. There can be additional holes through the membrane which are too small to pass the conical shaped solute particles but which can pass other constituents of the solution.

Plural asymmetric membranes can be used in the invention. Therefore, in the figures and text, for simplicity sake, "a membrane" is referred to where one or more than one membrane is used in series. When more than one membrane is used in series it is further to be understood that the membranes are so oriented that the tapers of the holes through all of the sequential membranes have the same orientation, small holes in one direction, large holes in the opposite direction.

The taper of the holes through the membrane is clearly defined by the above criteria. To further specify the geometry, the diameter of the larger openings are generally less than about 100 times the diameter of the smaller openings with 2 to 10 times the diameter of the smaller openings being the preferred configuration.

The diameter of the base of the conical shaped solute particles relative to its length is described above. To further specify the dimensions of the conical shaped solute particles, the diameter of the base of the conical shaped solute particles is usually less than about half of the diameter of the smaller opening of the hole through the membrane with one third to one fifth of the diameter of the smaller opening being a preferred diameter for the base of the conical shaped solute particle.

The length of the conical shaped solute particles is specifically described above. To further specify the dimensions of the conical shaped solute particle, the length of the conical shaped solute particle is less than 20 times as large as the diameter of the large hole opening through the membrane with 1.2 to 3 times as large being the preferred length of the conical shaped solute particles.

The diameter of the base of the conical shaped solute particles is specifically described above. To further specify the diameter of the base of the conical shaped solute particles, the diameter of the base of the conical shaped conical particles is greater than about 1/100th of the length of the conical shaped solute particles with 1/8th to 1/20th of the length being a preferred diameter.

The concentration of the conical shaped solute particles in the solvent can vary over a wide range and the optimal concentration will depend upon the various parameters of the specific application. Such factors as the specific size of the conical shaped solute particles, size of the tapered holes through the membrane, density of tapered holes per unit surface area of the membrane, viscosity of the solution, temperature range of operation, an operating pressure range for the whole system. In general, the concentration of the conical shaped solute particles, on a weight/weight basis, of between about 0.001% and 80% are useful with a concentration of 0.5% to 10% being preferred for some applications.

The membranes of the present invention are generally not more than about 5 millimeters thick, with a thickness of from 1 $\mu$m to 20 $\mu$m being particularly useful for certain applications and a thickness of from 25 nm to 500 nm being particularly useful for certain other applications.

Figure 3:
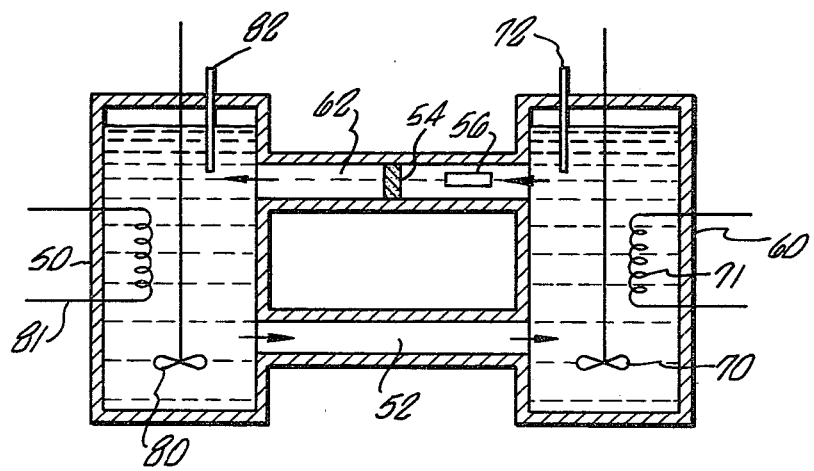
FIG. 3 is a cross-sectional side elevation view of a microporous member mounted in one of a pair of conduits connecting two tanks filled with a solution.

Referring now to FIG. 3 there is shown a test unit comprising tanks 50 and 60 interconnected by conduits 52 and 62. An asymmetric microporous membrane 54 to be tested, is sealed, solution tight so that movement of the solution of conical shaped solute particles past the membrane can only occur by passage of the solution through the tapered holes of the membrane, and oriented so that the smaller openings of the tapered holes through the membrane are directed towards tank 50. There is a liquid current meter 56 positioned in conduit 62, to measure the liquid flow through conduit 62. The solution in tank 60 is kept constant above ambient temperature at $T_1°C$. by the following equipment which is not shown in FIG. 3; an electric stirrer 70, an immersion heater 71 and a thermoregulator 72. The solution in tank 50 is kept constant below ambient temperature at $T_2°C$. by the following equipment which is not shown in FIG. 3: an electric stirrer 80, and immersion refrigeration unit 81 and a thermoregulator 82.

The rate at which heat is transferred from tank 60 to tank 50 through conduit 62 will be a function of the various physical parameters of the system such as the temperatures $T_1$ and $T_2$, the flow rate as measured by the current flow meter, the specific shape and density of tapered holes per unit area through the asymmetric microporous membrane 54, the composition and concentration of the various solutes in the solution, the solvent of the solution, and can be ascertained by experiment.

Within the last two decades, techniques have been developed for the fabrication of thin filters and membranes with/either cylindrical or tapered holes, of small diameter, through the member. Filters with approximately uniform tapered hole only 0.005 $\mu$m in diameter at the small end have been developed by the General Electric Company. Methods for making membranes with tapered holes are described for example in Bean et al, U.S. Pat. No. 3,770,532 and Fleischer et al, U.S. Pat. No. 3,415,993. In the case of membranes with approximately cylindrical holes through the membrane, the holes can be converted to tapered holes by treating one side of the membrane, for example by acid etching, base etching, solvent etching or the like. Methods for making membranes with small cylindrical holes through the membrane are described by Price et al, U.S. Pat. No. 3,303,085. Plastic sheets 10 $\mu$m thick, perforated with cylindrical holes of approximately uniform diameter and close tolerance, of various diameters, with holes as small as 0.015 $\mu$m in diameter are commercially available from Nuclepore Corp., 7035 Commerce Circle, Pleasanton, CA 94566. Achievement of the desired geometry can be confirmed by electron microscopy.

The conical shaped particles useful in the invention can be obtained as crystals. For example the following materials naturally form needle shaped crystals when grown from solution:

Anthanilic acid picrate
2,5-Dichloroaniline picrate
β-Naphthylamine picrate
Quinoline picrate
Malic dianilide
Sulfosalicylic anilide
Diisobutyl ketone semicarbazone
Hexaldehyde semicarbazone
Caffeine The conical shaped particles useful in the invention can be obtained as skeletal fragments from living organisms. For example sponge spicules occur as smooth tapered needles of calcite or silica and are almost perfectly circular in cross section.

The conical shaped particles useful in the present invention can also be obtained by casting from taper-shaped templates using techniques well known to those skilled in the art. Suitable templates with taper-shaped holes include the membranes described in various places including Bean et al, U.S. Pat. No. 3,770,532 and Fleischer et al, U.S. Pat. No. 3,415,993.

Among the useful casting materials are, cellulose acetate, silicone rubber, formvar and polymerized styrene-divinylbenzene, all of which are well known to those skilled in the art.

The conical shaped particles useful in the present invention can also be obtained by vapor deposition of metals on taper-shaped templates again using techniques well known to those skilled in the art. Suitable templates with taper-shaped holes include the membranes described, for instance, in Bean et al, U.S. Pat. No. 3,770,532 and Fleischer et al, U.S. Pat. No. 3,415,993.

Liquids useful in the invention as the solvent include pure solvents, mixtures of solvent liquids and solutions comprising a solevent and a variety of dissolved materials. For example the following pure solvents, or mixtures thereof, are useful:

Water
Methanol
Ethanol
Benzene
Carbon tetrachloride
Cyclohexane
Ethylene glycol

Among the useful classes of dissolved materials which might be useful for particular applications of the present invention are:

Inorganic salts
Antioxidants
Surface active agents
Antibiotic agents
Antifungal agents
Antimold agents
Wetting agents
Antifloculating agents
Dispersing agents
Anticorrosion agents
Soluble polymeric material of molecular weight 1,000 to 500,000
Lubricants

EXAMPLE I

A template prepared from a polycarbonate sheet ("Lexan" or "Makrofol"), about 10 $\mu$m thick, according to the techniques given in Bean et al, U.S. Pat. No. 3,770,532, and where the conical shaped holes are about 25 nm in diameter and about 350 nm deep and where the hole density is approximately $10^6/cm^2$, can be used to cast conical shaped particles as described below.

A casting liquid mixture is prepared from 900 parts of inhibitor free styrene, 99 parts of inhibitor free commercial divinyl benzene (as a crosslinking agent), and 1 part of benzoyl peroxide. After the excess casting liquid is removed from the template, the filled form is heated in an oven to about 90° C. for 4 hours to polymerize the styrene with crosslinking.

The template and polymerized castings are placed in a 6.0 N sodium hydroxide solution, held at 80° C. for several hours and until the supporting template completely dissolve. The resulting basic solution is freed of small fragments, salts and excess base by dialysis against water from a dialysis bag which passes particles of molecular weight 5,000 and smaller. The contents of the dialysis bag are evaporated to dryness and the dry residue taken up in 10 parts of concentrated sulfuric acid, heated to 90° C. for 5 minutes and quickly cooled to 0° C. Ten parts of ice is added to the mixture for each part of sulfuric acid used. After the reaction subsides the solution is neutralized with 10% sodium hydroxide solution. The neutral solution is dialysed against water from a dialysis bag which passes particles of 5,000 molecular weight and less until free of low molecular weight salts. The dialyzed neutral solution of conical shaped particles of sulfonated polystyrene is concentrated by evaporation to a solids concentration of 1%, under reduced pressure, to give solution A.

The test unit, FIG. 3, described above is filled with solution A and the heat transport rates determined for various temperatures, $T_1$ and $T_2$ in the tanks 60 and 50 respectively, for various asymmetric microporous membranes in the test unit confirming circulation of the solution through the unit.

I claim:

1. A system for the circulation or movement of a solution comprising a conduit for the solution, a solution of conical shaped solute particles, and an asymmetric microporous membrane positioned in the conduit so that solution flow through the conduit can only occur by passage of the solution through the membrane, the pores of the membrane being approximately uniform in size and tapered, from a large opening to a small opening, substantially all of the large openings being on one face of the membrane and substantially all of the small openings being on the other face of the membrane, wherein the conical shaped solute particles are all of approximately the same size, the length of the particles being greater than the diameter of the larger opening of the tapered holes through the membrane, the diameter of the base of the conical shaped solute particles being less than the diameter of the smaller opening of the tapered holes through the membrane, the length of the conical shaped solute particles being greater than the diameter of the base of the conical shaped solute particles, the length of the conical shaped solute particles being not more than about 100 microns.

2. A system according to claim 1 comprising a plurality of asymmetric microporous membranes, the membranes being oriented in the conduit such that the small end of the tapered holes are in one direction and the large end of the tapered holes are in the opposite direction.

3. A system according to claims 1 or 2 wherein the thickness of the membrane is not more than about 5 millimeters.

4. A system according to claims 1 or 2 wherein there are additional holes through the asymmetric microporous membrane which permit the passage of solvent molecules and exclude the passage of the conical shaped solute particles.

5. A system according to claims 1 or 2 wherein the membrane is in the form of a member selected from the group consisting of a flat sheet, a corrugated sheet, a dimpled sheet, a tube open at one end and a tube open at both ends.

6. A system according to claims 1 or 2 wherein the diameter of the larger openings to the tapered holes is less than about 100 times the diameter of the smaller openings, the length of the conical particles is less than 20 times the diameter of the larger openings, the diameter of the base of the conical particles is greater than about 100th of the length of the conical particles, and the concentration, on a weight/weight basis, of the conical particles in the solvent is between about 0.001% and 80%.

7. A system according to claim 6 wherein the diameter of the larger openings is 2 to 10 times the diameter of the smaller openings, the length of the particles is 1.2 to 3 times the diameter of the larger openings, the diameter of the base of the particles is 1/8th to 1/20th of the length of the particles, and the concentration of the particles is in the range of from 0.5% to 10%.

8. A system according to claim 6 wherein the thickness of the membrane is 1 $\mu$m to 20 $\mu$m.

9. A system according to claim 6 wherein the thickness of the membrane is 25 nm to 500 nm.

10. A system according to claim 7 wherein the thickness of the membrane is 1 $\mu$m to 20 $\mu$m.

11. A system according to claim 7 wherein the thickness of the membrane is 25 nm to 500 nm.

* * * * *